O. J. OWEN.
MANUFACTURE OF ARTIFICIAL ROOFING SLATE.
APPLICATION FILED DEC. 30, 1914.
1,193,416.
Patented Aug. 1, 1916.
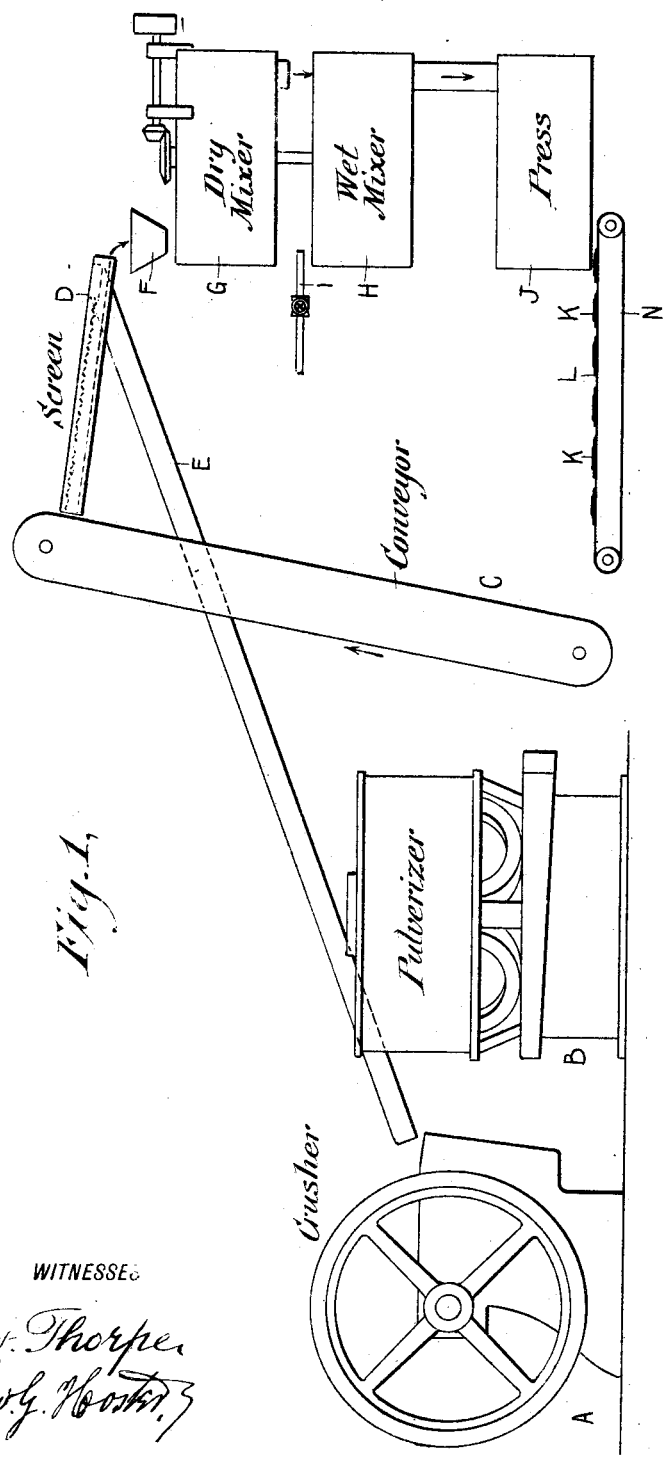
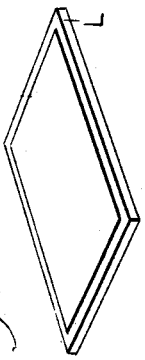
INVENTOR
Owen Jones Owen

UNITED STATES PATENT OFFICE.

OWEN JONES OWEN, OF BLAENAU FESTINIOG, WALES.

MANUFACTURE OF ARTIFICIAL ROOFING-SLATE.

1,193,416.  Specification of Letters Patent.  Patented Aug. 1, 1916.

Application filed December 30, 1914. Serial No. 879,659.

*To all whom it may concern:*

Be it known that I, OWEN JONES OWEN, a subject of the King of Great Britain, residing at The Granville, Church street, Blaenau Festiniog, county of Merioneth, Wales, Great Britain, have invented new and useful Improvements in the Manufacture of Artificial Roofing-Slate, of which the following is a full, clear, and exact description.

The object of the invention is to provide certain new and useful improvements in the manufacture of artificial roofing slate from waste slate material whereby the cost of production is reduced to a minimum and the artificial roofing slate or tile produced is of lasting quality and is practically rendered non-porous and hence not liable to absorb moisture when in use.

In order to accomplish the desired result, use is made of a method whereby the waste slate material is reduced to a coarse state and a portion thereof is reduced to a fine state, the two portions then being mixed dry with a binding material such as cement, and then the mixture is again agitated with the addition of water to form a plastic mass which is pressed by a suitable press into slate form, and then this slate is permeated with silicate of sodium and subsequently with chlorid of calcium to form an insoluble silicate of calcium. The artificial roofing slate produced by this method consists of a mixture of coarse and fine waste slate material, a binding substance and silicate of calcium.

In order to carry the above method into effect I prefer to use an apparatus such as shown in the accompanying drawings forming part of this specification, in which similar characters of reference indicate corresponding parts in both views, and in which—

Figure 1 is a side elevation of the apparatus; and Fig. 2 is a perspective view of one of the plates supporting a pressed slate.

The waste slate material is crushed into a coarse powder by the use of a suitable stone breaker or a crusher A of any approved construction, and about one-quarter of the coarse powder is placed into a pulverizer or a mill B, which grinds the coarse powder into very fine powder. In practice I have found that the best results are obtained by reducing the slate material in the first stage into coarse or granular form, and a portion of this granular slate material is reduced to a fine or impalpable state. The coarse powder and the fine powder are next carried by an elevator or conveyer C to a screen D, preferably provided with tightly stretched piano wires to separate the tailings from the coarse and fine powder and to return the tailings by a chute E to the crusher A. The coarse and fine powder passes from the screen D through a hopper F into a mixing machine G in which the powders are intimately mixed together with a suitable binding substance such as Portland cement. When the materials have been thoroughly mixed, they are discharged into a second mixer H supplied with water through a suitable water supply pipe I to produce a plastic mass which is periodically discharged into a press J by which the plastic material is pressed into slates K on top of plates L of metal or other suitable material. In practice each plate L is placed to one side of the press mold and with its surface flush with the top of the mold, after which the mold is filled with the plastic material and the latter is then subjected to pressure of, at least, two tons to the square inch. The pressed slate is next pushed out of the mold and onto the adjacent plate L, and then the above-described operation of pressing another slate is repeated. It is desirable that the plungers and mold of the press J are heated by steam or dampened and heated by injecting steam into them. The pressing of the slate is carried on at the rate of about nine pressings a minute in each mold. I find that the plates L are absolutely necessary when slates of sizes such as 16x8, 18x9 or 20x10 inches, and still larger ones, are molded with only five-sixteenths of an inch, or even less, in thickness. The plate L with the slate K superimposed thereon next passes from the press J onto the endless conveyer belt N for carrying it to a drying room having a moist atmosphere at a normal temperature, say of 60°, and well protected against draft. It is understood that the waste slate material in coarse powder form gives the desired strength to the slate or tile while the waste slate material in fine powder form together with the Portland cement fills the interstices in the mixture to insure the subsequent formation of an exceedingly strong and solid slate or tile. As the slate produced is but five-sixteenths of an inch or even less in thickness it is evident that if made only of fine powder slate material and cement it would lack the desired strength, and if made only of coarse grain slate material interstices detrimental to the strength of the slate or tile would be formed; but by using a mixture of coarse grain slate material, fine grain slate material and cement the desired strength is obtained. By allowing the slate or tile to set in a moist atmosphere, as above described, the setting process takes place gradually and the particles are firmly bound together to produce the desired toughness in the slate or tile. The artificial slates or tiles at this stage although to all appearances quite marketable have one great defect as a roofing material, namely, they absorb water. In order to render the slates non-porous use is made of a solution of silicate of sodium applied to the surface of each slate with a brush so that the solution rapidly soaks into the slate. When the slate has been permeated with the solution then a solution of chlorid of calcium is applied to the slate by the use of another brush, and when this solution has soaked into the slate then whatever salt or other matter remains on the surface of the slate is wiped off with a rag in order to prevent the formation of salt crystals on the surface of the slate.

It is understood that by reason of the reaction of the one chemical on the other the pores of the slate or tile are filled with a hard insoluble silicate of calcium, thus rendering the slate non-porous. It is understood that by applying the solutions with a brush to the slate K while the latter rests on the plate L, the solutions are uniformly distributed in the plastic material and the chemical reaction of the two chemicals takes place throughout the thickness of the slate, thus forming a slate of lasting quality and which is practically non-porous and hence not liable to absorb moisture when in use.

Having thus described my invention, I claim as new and desire to secure by Letters Patent:

1. The herein described method for manufacturing artificial roofing slate from waste slate, consisting in mixing coarse waste slate material, fine waste slate material, cement and water, then pressing the resultant mixture while moist into the form of a slate and supporting the slate throughout its under surface, then drying the slate in a moist atmosphere and while so supported filling the pores of the pressed slate with a silicate to render the slate insoluble and nonporous.

2. The herein described method for manufacturing artificial roofing slate from waste slate material consisting in mixing coarse granular waste slate material, pulverized impalpable waste slate material and a binding substance, then moistening the mixture, then pressing the moistened mixture into a slate and supporting the slate throughout its under surface, then drying the slate in a moist atmosphere and while so supported, then saturating the slate with silicate of soda and subsequently with chlorid of calcium to permeate the slate with silicate of calcium.

3. The herein described method for producing artificial roofing slate from waste slate material, consisting in reducing the waste slate material to coarse granular form, then reducing a portion of the said coarse granules into fine impalpable powder form, then mixing the coarse and fine slate material with cement, then mixing the resultant dry mixture with water to form a plastic mass, then pressing the plastic mass into a slate and supporting the latter throughout its under side, then drying the slate in a moist atmosphere, then applying a solution of silicate of sodium to the slate to allow the said solution to soak in, and then applying a solution of chlorid of calcium to the slate to soak in and combine with the silicate of sodium to form a hard insoluble silicate of calcium filling the pores of the slate.

In testimony whereof I have signed my name to this specification in the presence of two subscribing witnesses.

OWEN JONES OWEN.

Witnesses:
 Theo. G. Hoster,
 Philip D. Rollhaus.